July 20, 1937.  H. B. STUART  2,087,787
FARE COLLECTOR
Filed May 15, 1933  12 Sheets-Sheet 1
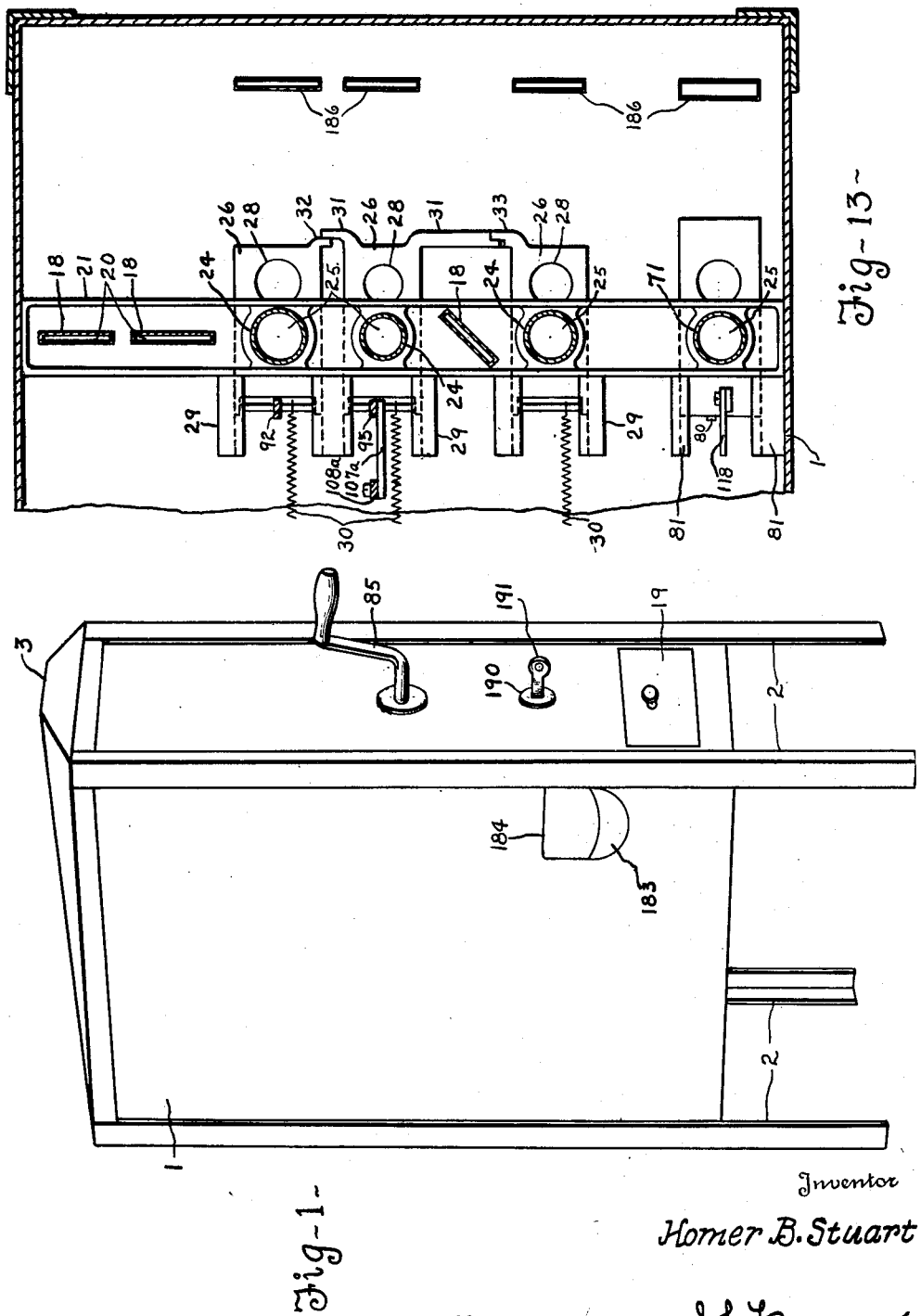
Inventor
Homer B. Stuart
By
J. S. Murray
Attorney

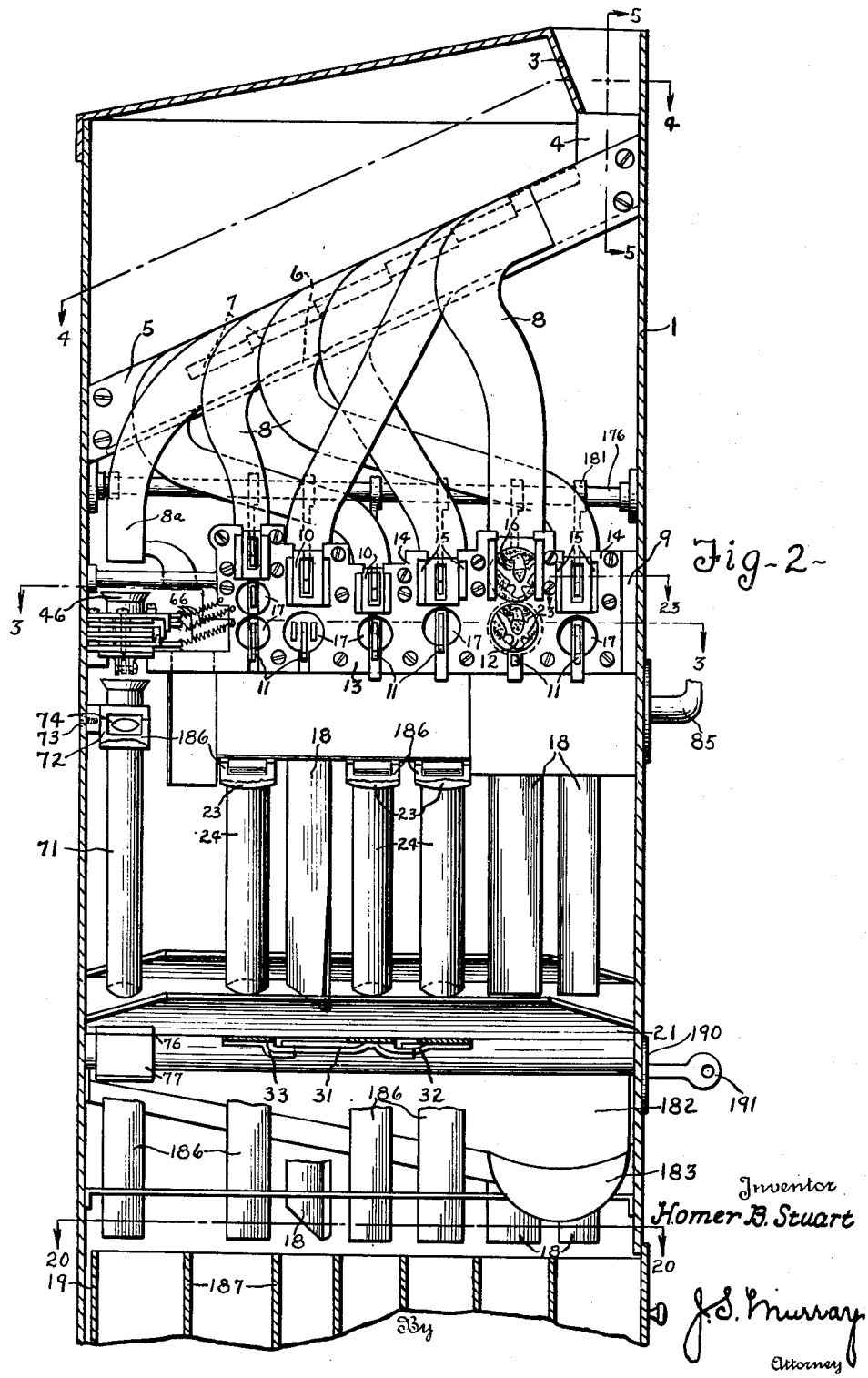

July 20, 1937.　　　　　H. B. STUART　　　　　2,087,787
FARE COLLECTOR
Filed May 15, 1933　　　12 Sheets-Sheet 3
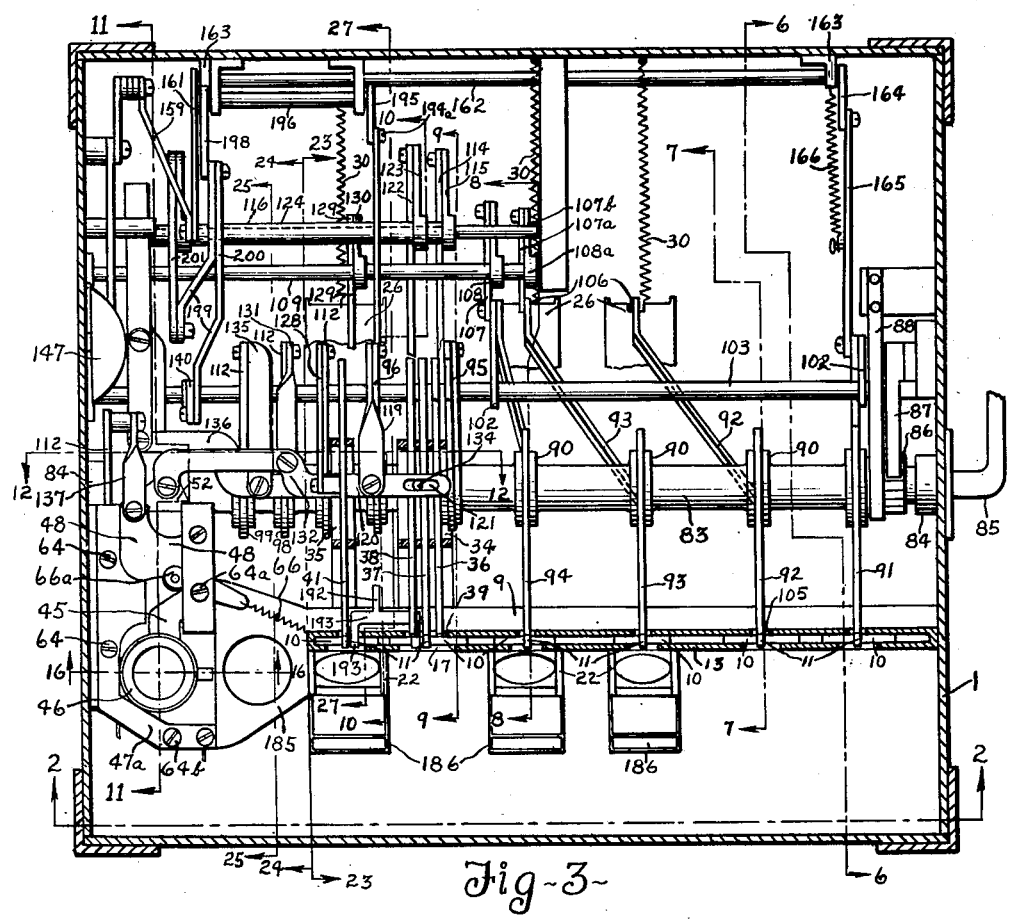
Fig-3-
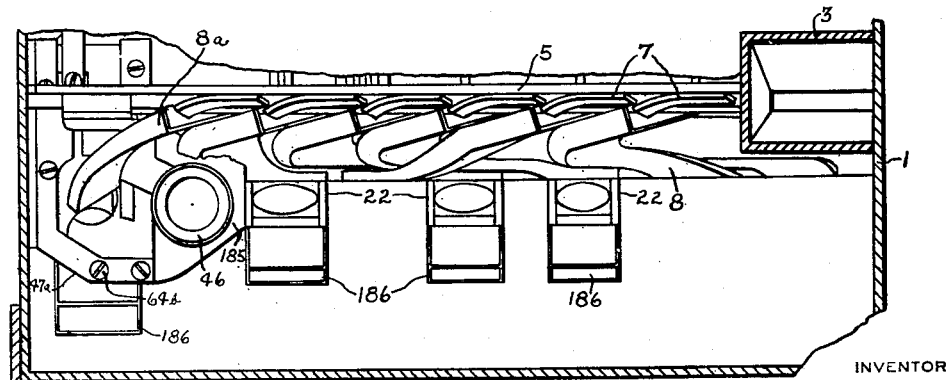
Fig-4-
INVENTOR
Homer B. Stuart
BY
J. S. Murray
ATTORNEY July 20, 1937.　　　　H. B. STUART　　　　2,087,787
FARE COLLECTOR
Filed May 15, 1933　　　12 Sheets-Sheet 4
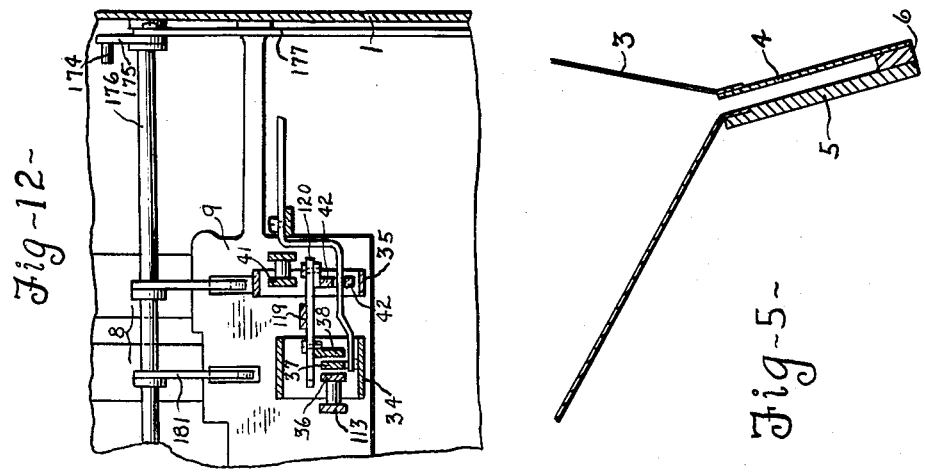
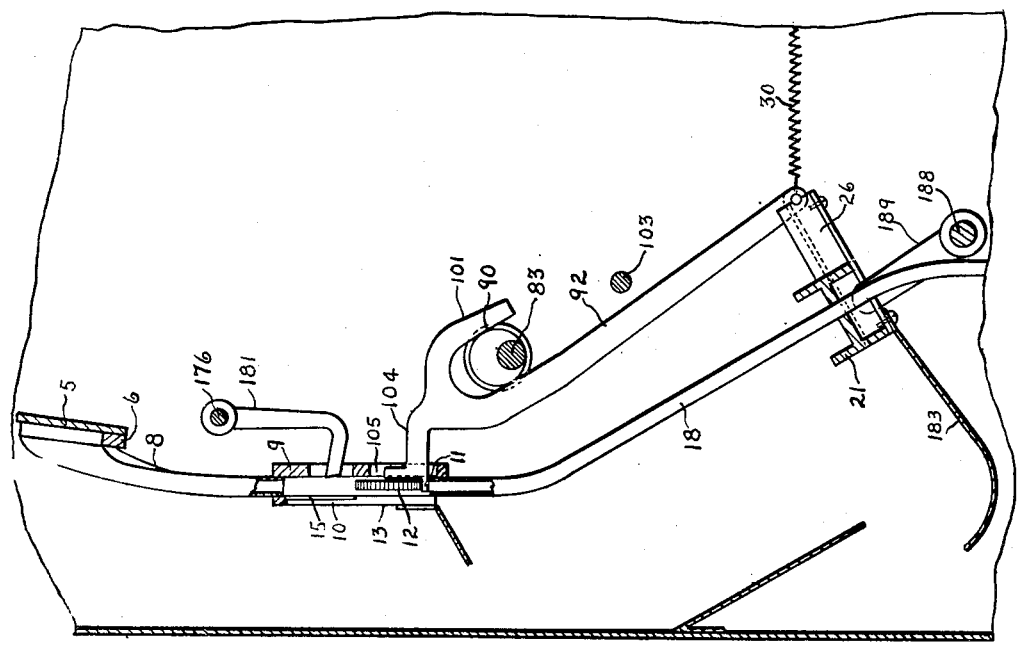
Inventor
Homer B. Stuart

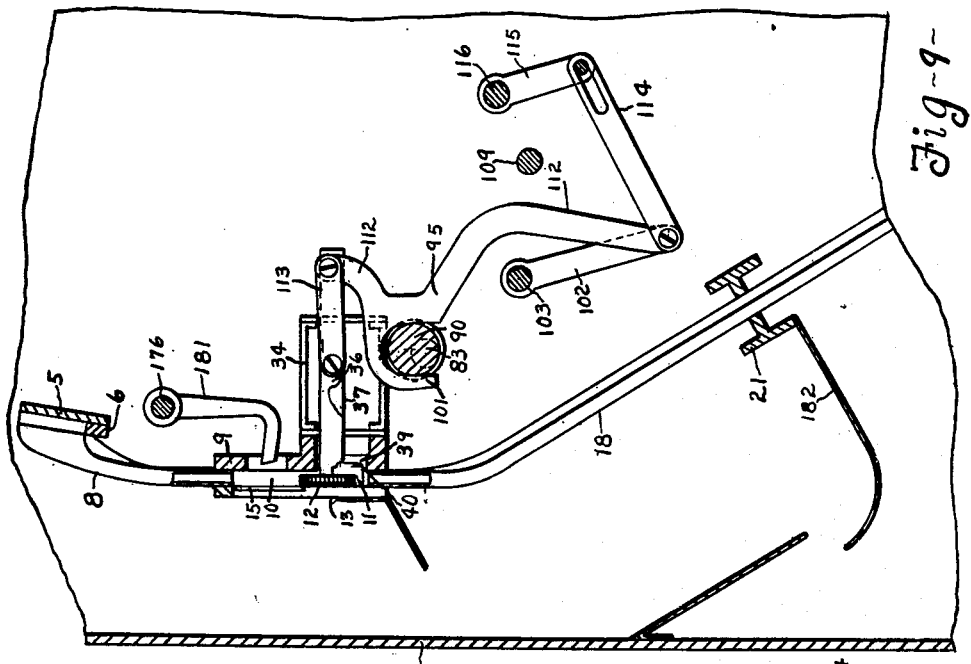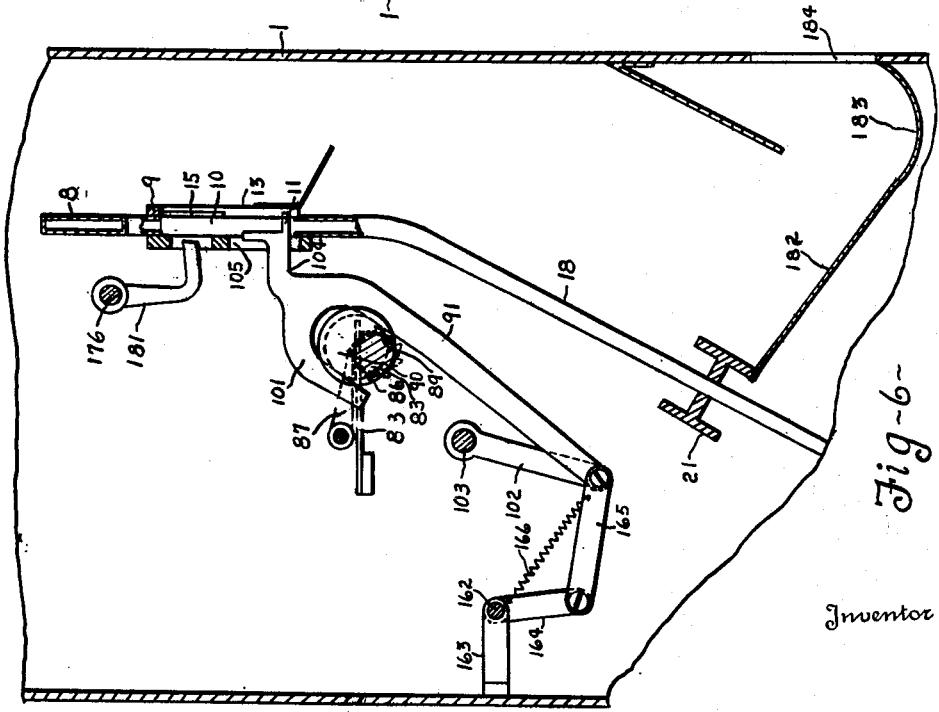

July 20, 1937.　　　　H. B. STUART　　　　2,087,787
FARE COLLECTOR
Filed May 15, 1933　　　12 Sheets-Sheet 6
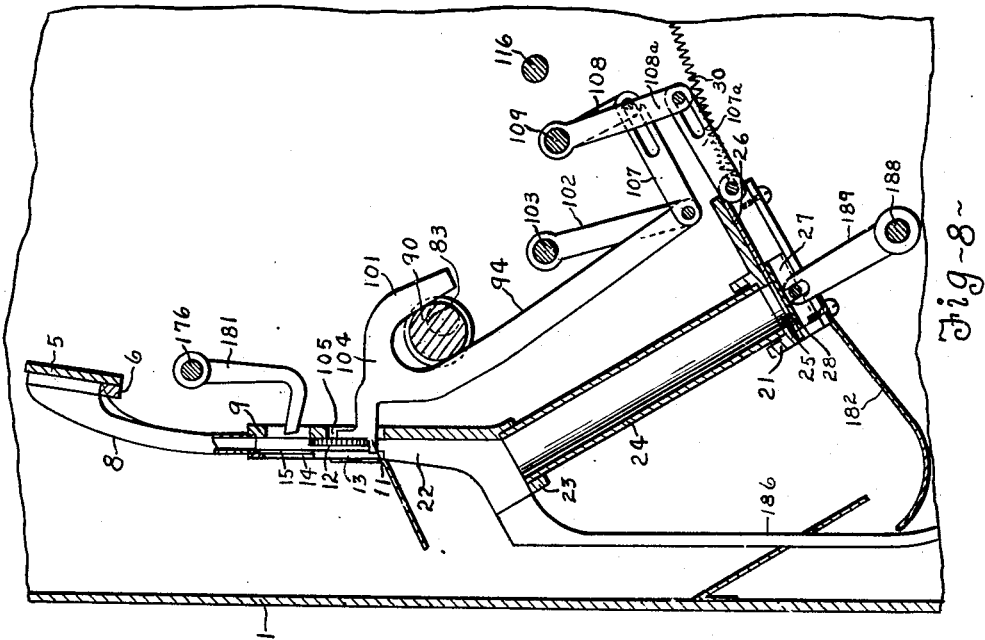
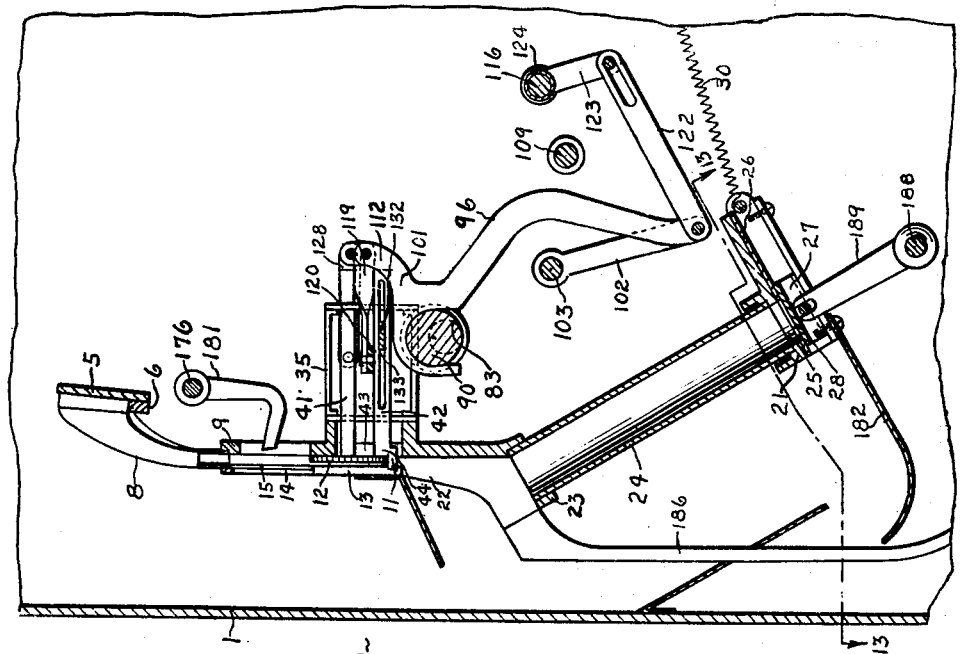
Homer B. Stuart
By J. S. Murray
Attorney

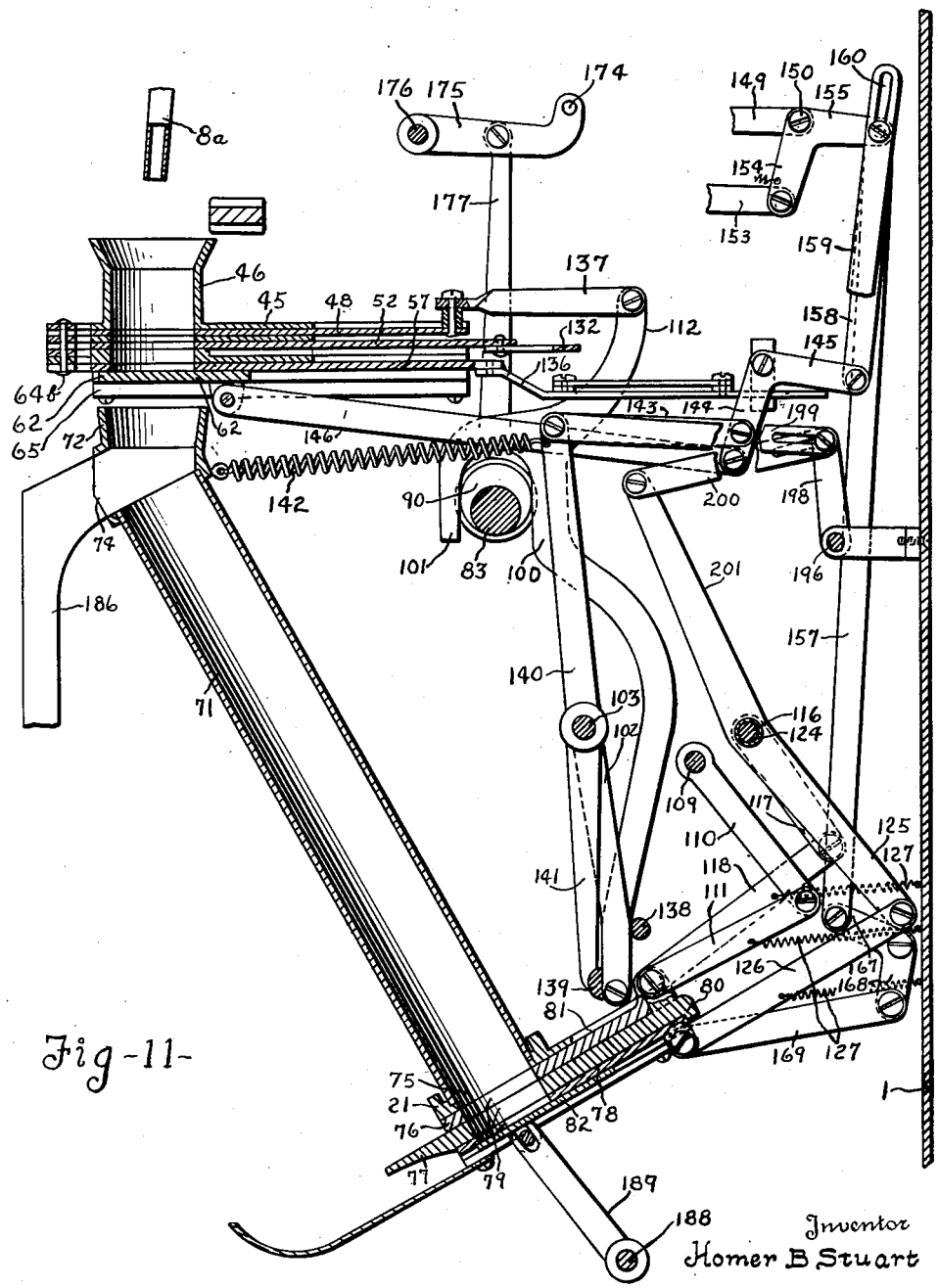

July 20, 1937. H. B. STUART 2,087,787
FARE COLLECTOR
Filed May 15, 1933 12 Sheets-Sheet 8
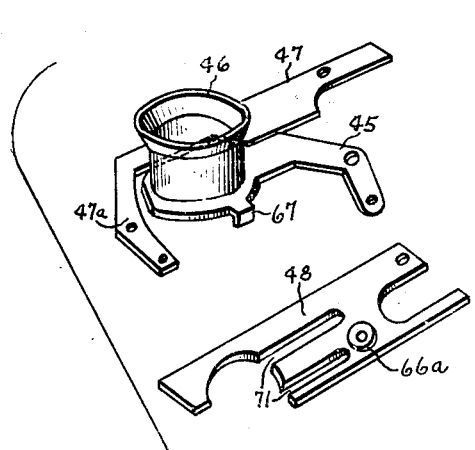
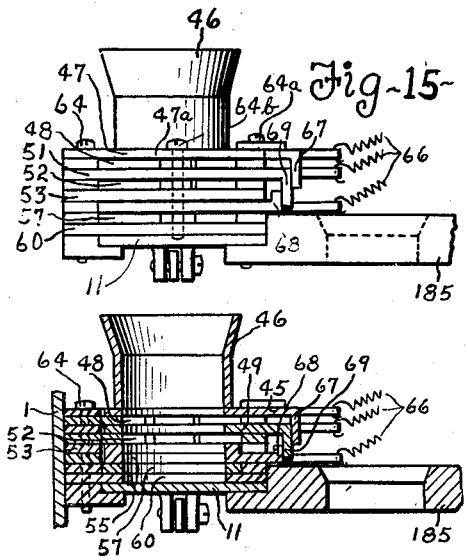
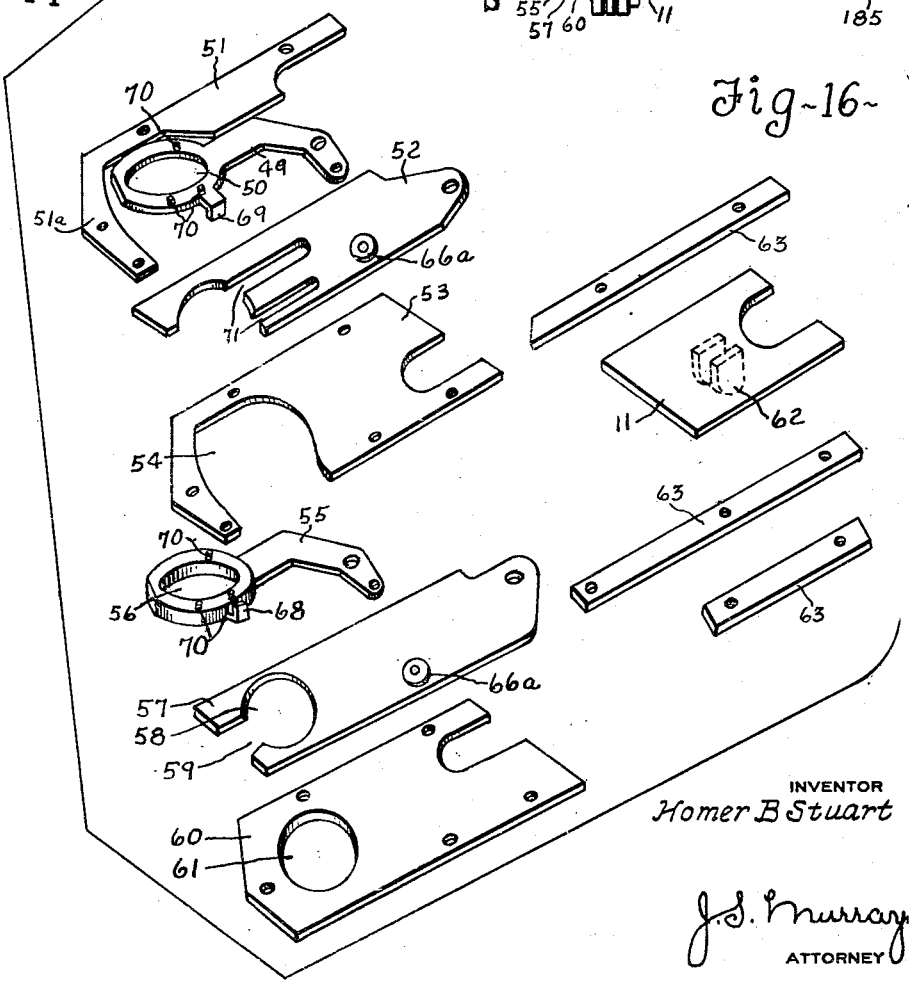
INVENTOR
Homer B Stuart
J. S. Murray
ATTORNEY

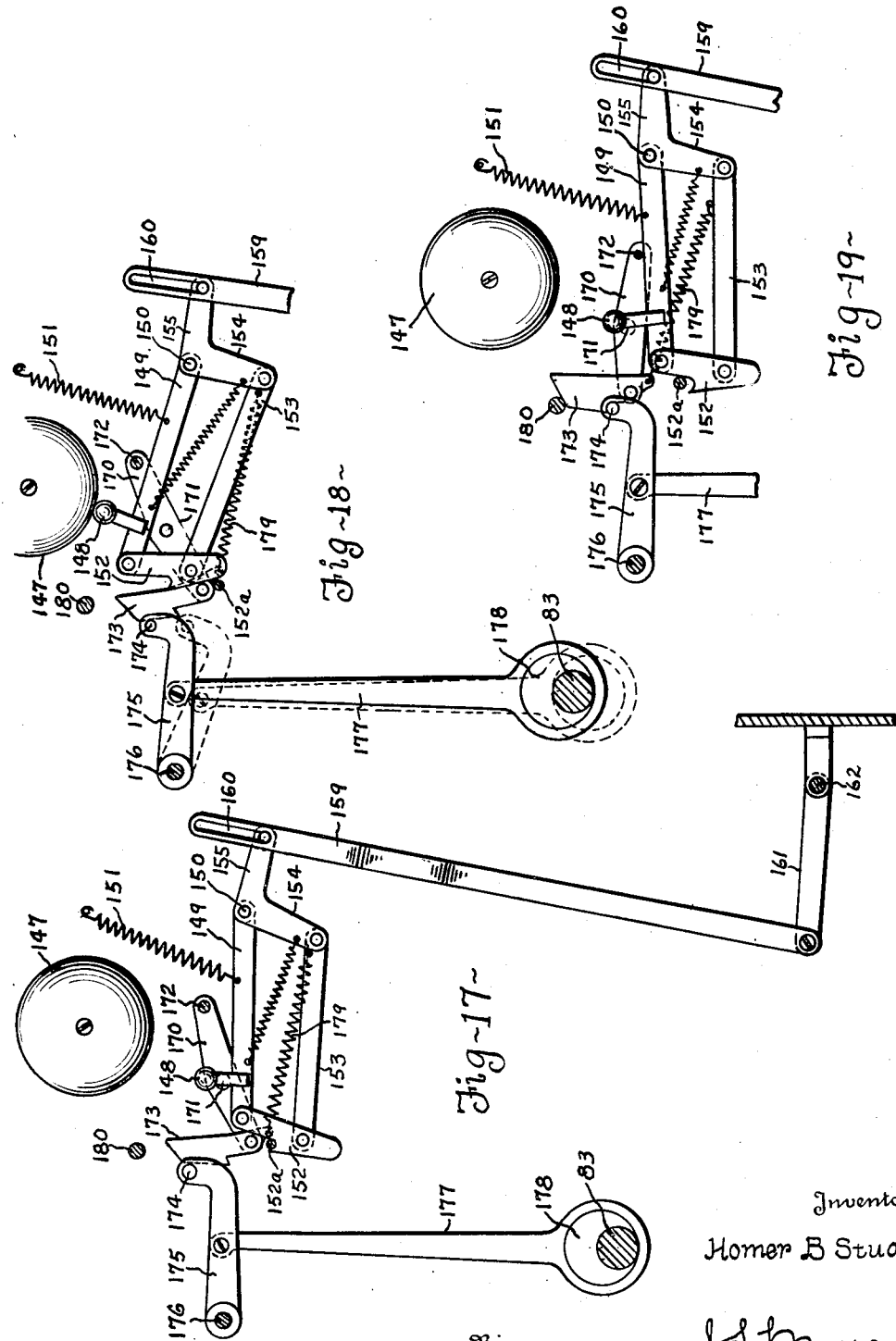

July 20, 1937.　　　H. B. STUART　　　2,087,787
FARE COLLECTOR
Filed May 15, 1933　　12 Sheets-Sheet 10

INVENTOR.
Homer B. Stuart
BY
ATTORNEY.

July 20, 1937.  H. B. STUART  2,087,787
FARE COLLECTOR
Filed May 15, 1933   12 Sheets-Sheet 11
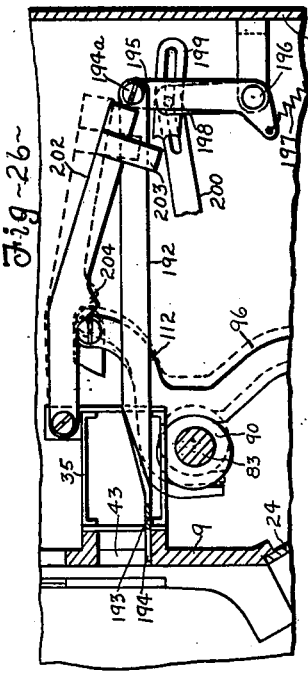
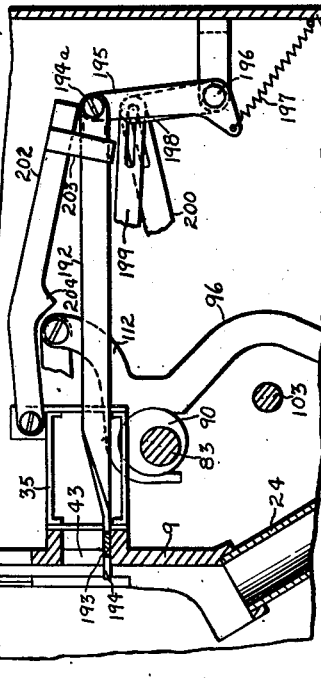
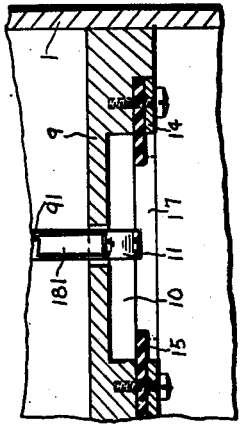
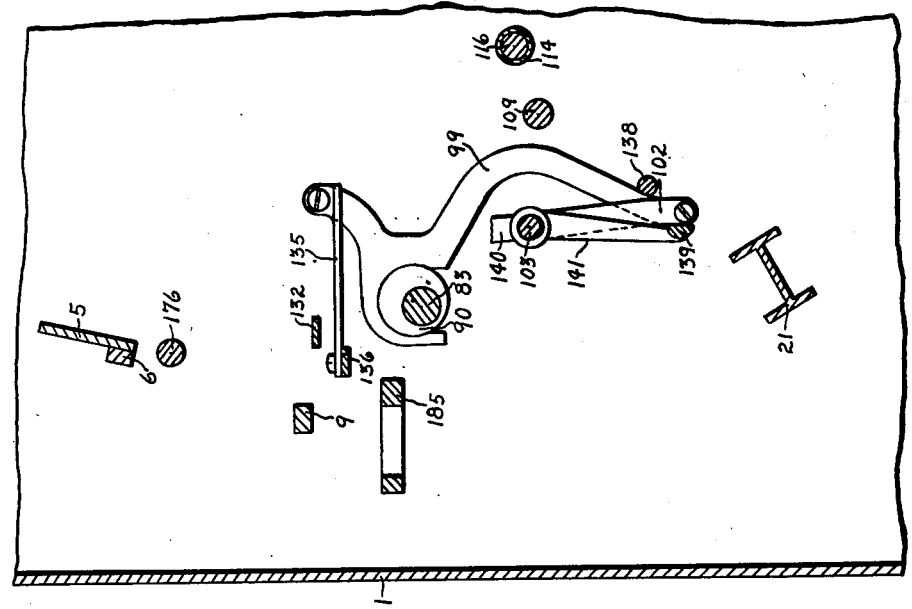
INVENTOR.
Homer B. Stuart
BY J. S. Murray
ATTORNEY.

July 20, 1937.　　　　H. B. STUART　　　　2,087,787
FARE COLLECTOR
Filed May 15, 1933　　　12 Sheets-Sheet 12
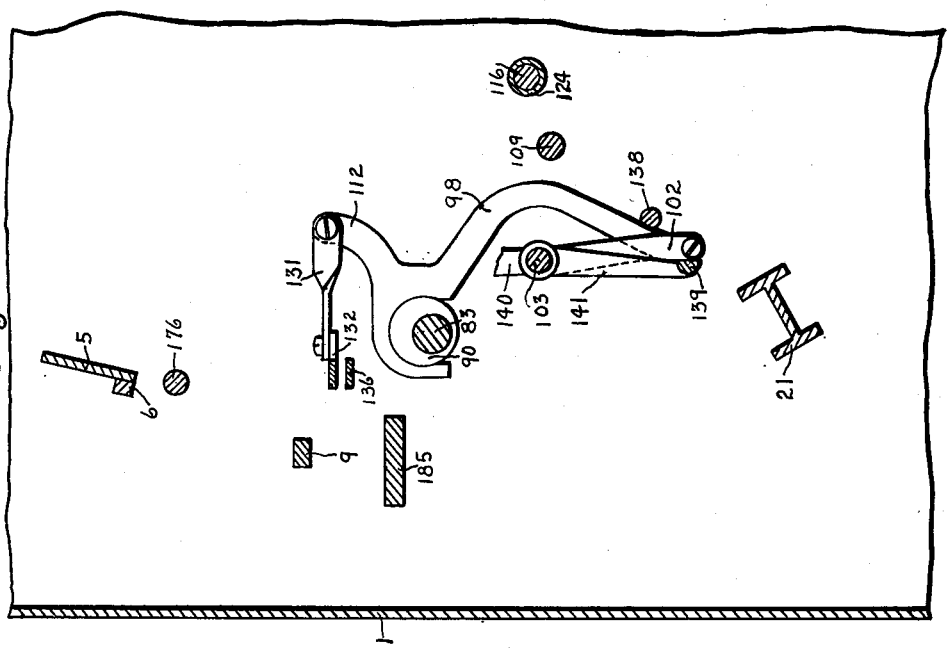
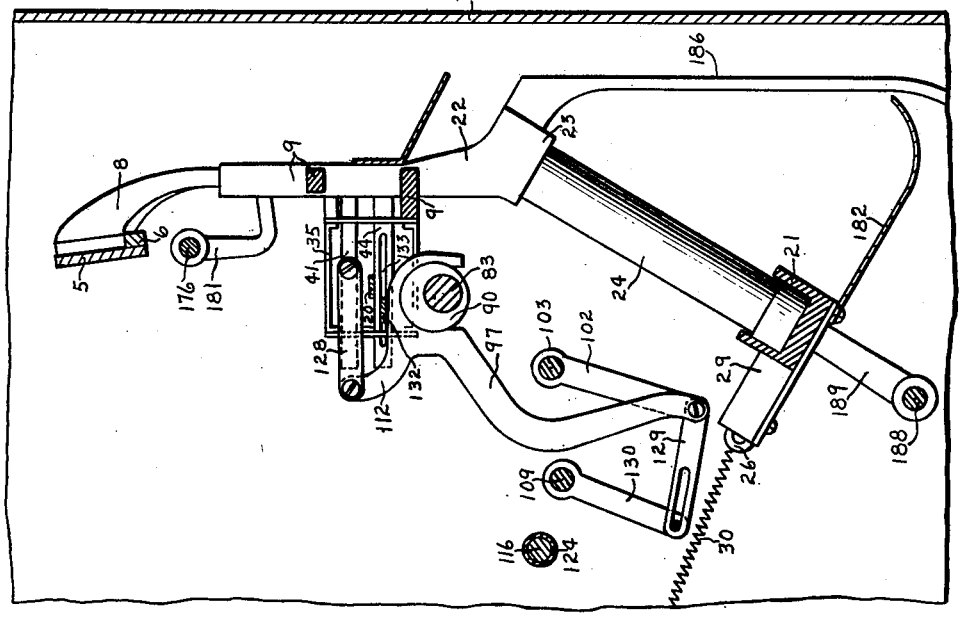
INVENTOR.
Homer B. Stuart
BY
ATTORNEY.

Patented July 20, 1937

2,087,787

UNITED STATES PATENT OFFICE 2,087,787

FARE COLLECTOR

Homer B. Stuart, Detroit, Mich.

Application May 15, 1933, Serial No. 671,057

17 Claims. (Cl. 194—2)

This invention relates to coin receiving and change-making machines, and has a particular application to the collection of fares on cars, busses, or other vehicles.

An object of the invention is to provide a machine wherein a passenger (or other payer) may deposit a coin or coins in payment of fare (or other fee), and comprising mechanism operable in a simple manner by an attendant, to automatically detect the denomination of such coin or coins, select such change as the deposit requires, and deliver said change to the passenger.

Another object is to equip such a machine with a signal which, upon operation of the machine by the attendant, will audibly indicate to the passenger and attendant payment of a correct fare.

A further object is to equip such a machine with a simple and improved mechanism for automatically separating coins or tokens of different denominations and differentially delivering the same to detector mechanism.

A further object is to automatically effect a rejection by the machine and a return to the passenger (or other payer) of any deposited coin or coins in excess of the fare (or other fee).

A further object is to adapt coins of certain denominations to be automatically delivered to change receptacles when paid into the machine, to automatically make change from said receptacles in amounts determined by the denomination of subsequently paid fares (or other fees), and to adapt any excess of change coins accumulating in said receptacles to be automatically delivered to a suitable cash box.

A further object is to provide a simple mechanism for emptying all of said change receptacles into the cash box when desired.

These and various other objects the invention attains by the construction hereinafter described, and illustrated in the accompanying drawings, wherein:

Fig. 1 is a perspective view of the machine.

Fig. 2 is a vertical sectional elevation of the machine taken upon the line 2—2 of Fig. 3.

Fig. 3 is a horizontal sectional view taken upon the line 3—3 of Fig. 2.

Fig. 4 is a fragmentary horizontal section taken on the line 4—4 of Fig. 2, primarily showing the sorting bar of the machine.

Fig. 5 is a vertical sectional view of the hopper and sorting bar taken upon the line 5—5 of Fig. 2.

Fig. 6 is a vertical sectional view, taken upon the line 6—6 of Fig. 3.

Fig. 7 is a vertical sectional view taken upon the line 7—7 of Fig. 3.

Fig. 8 is a vertical section taken on the line 8—8 of Fig. 3.

Fig. 9 is a vertical section taken on the line 9—9 of Fig. 3.

Fig. 10 is a vertical sectional view taken upon the line 10—10 of Fig. 3.

Fig. 11 is a vertical sectional view taken upon the line 11—11 of Fig. 3.

Fig. 12 is a transverse vertical sectional view taken upon the line 12—12 of Fig. 3.

Fig. 13 is a horizontal sectional view taken upon the line 13—13 of Fig. 10.

Fig. 14 is a perspective view individually showing the principal parts comprising the cent detector assembly.

Fig. 15 is a front view of said assembly.

Fig. 16 is a transverse vertical section view of the same taken upon the line 16—16 of Fig. 3.

Fig. 17 is an elevational view of the bell-operating mechanism, showing the normal position of the parts.

Fig. 18 is a similar view showing the parts as positioned after the bell has been struck.

Fig. 19 is a similar view showing the parts as they appear immediately following a return of the striker mechanism to substantially normal position.

Fig. 22 is a fragmentary horizontal section, taken on the line 22—22 of Fig. 2 showing certain features of the detector bar.

Fig. 23 is a vertical sectional view taken on the line 23—23 of Fig. 3.

Fig. 24 is a vertical sectional view taken on the line 24—24 of Fig. 3.

Fig. 25 is a vertical sectional view taken on the line 25—25 of Fig. 3.

Fig. 26 is a fragmentary vertical section, taken on the line 26—26 of Fig. 3, and showing a coin-arresting mechanism in its retracted or coin releasing position.

Fig. 27 is a corresponding view showing the projected or coin arresting position of the parts.

Figure 21:
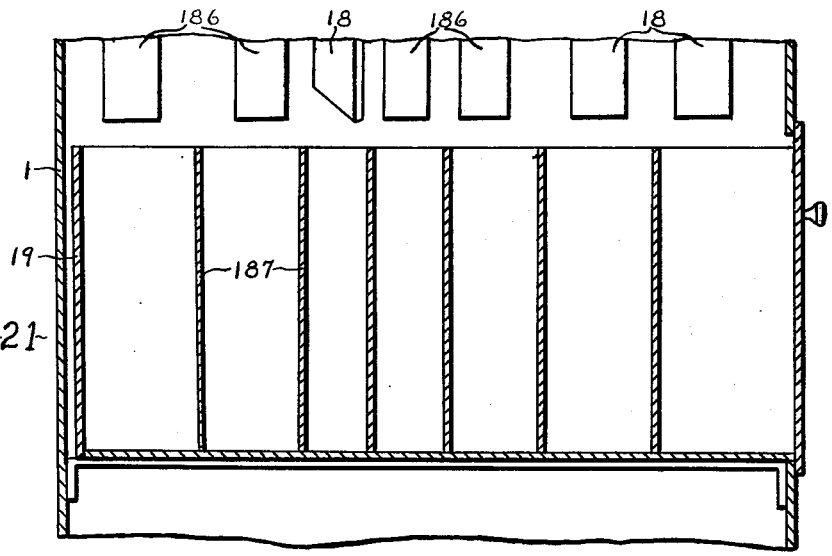
Fig. 21 is a vertical sectional view of the cash box, taken on the line 21—21 of Fig. 20.
Figure 20:
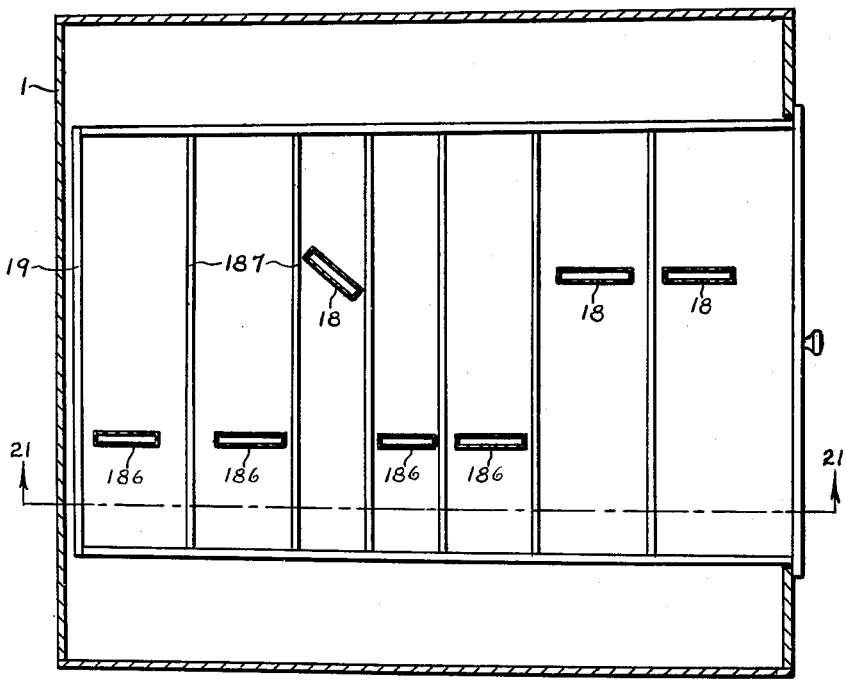
Fig. 20 is a horizontal sectional view taken upon the line 20—20 of Fig. 2, showing the cash box.

As herein disclosed, the invention is embodied in a machine designed to collect either a six cent or four cent fare, the lesser amount being required when the passenger carries a transfer token. This token consists, preferably, of a circular slug of a size intermediate a half dollar and quarter, and must be deposited in the machine with the transfer fare.

In paying a regular fare, the deposit may take the form of a half dollar, or a quarter, or a dime, or two nickels, or a nickel and one cent, or six pennies, or a ticket token.

The latter consists of a circular slug, preferably of a size intermediate a nickel and quarter, said token being acceptable as one regular fare and being if desired available to the passenger at a reduced rate when purchased in a required quantity.

In paying a transfer fare, there must be deposited a transfer token together with a half dollar, or a quarter, or a dime, or a nickel, or four pennies.

Upon deposit of a fare, the attendant, by a simple and unvarying crank or other operation, effects delivery of proper change, when required, to the passenger, and delivery of the deposited coin, coins, or token either to a cash box or one or more change receptacles, according to the nature of the deposit and to the space available in said receptacles. Preliminary to any such delivery, the machine automatically detects the denomination of the coins or tokens deposited and if the deposit is adequate, an audible signal is given, as aforesaid.

Referring now in greater detail to the drawings, the reference character 1 designates a casing, preferably rectangular, and formed of sheet metal, and supported at a suitable elevation by legs 2. Carried by the casing top is a bell mouthed hopper 3 (Figs. 2 and 5), having at its bottom a narrow elongated outlet for discharging coins or tokens paid into said hopper, edgewise and consecutively to a chute 4 in the casing. From said chute the coins or tokens are delivered edgewise to the upper portion of a sorting bar 5 (see Figs. 4 and 5), inclined between and carried by the side walls of the machine. Upon the front face of said bar, adjacent to its lower edge, there is extended a coin track 6, which may be formed, as shown, by securing a smaller bar to the bar 5. Said track extends from the outlet of the chute 4 to the lower portion of said bar, terminating short of the lower end of the bar. The coins or tokens delivered to said track are adapted, of their own weight to roll down the latter, being maintained against the front face of said bar, during such travel, by mounting the bar at a slight rearward inclination from its bottom to its top edge, as best appears in Fig. 5.

Secured to the front face of the bar 5, above said track, is a row of spaced sheet metal sorting fingers 7, (see Fig. 4) inclined conformingly to the bar and rigidly secured to the latter at their upper ends, their lower portions being forwardly diverged from the bar in a gradual curve. The spacing of said fingers above the track 6 is progressively and predeterminedly decreased, from the uppermost to the lowermost finger, whereby said fingers are respectively adapted to intercept coins or tokens of different diameters and deflect the same forwardly from the track. In the illustrated embodiment of the invention, there are provided six of the fingers 7, serving respectively to deflect half dollars, transfer tokens, quarters, ticket tokens, nickels and pennies. Dimes are of sufficiently small diameter to escape all of said fingers, and accordingly discharge from the lower end of the track.

Secured to the bar 5 and overlapping its front face are the mouths of a series of sheet metal chutes 8 (best shown in Fig. 2), one of which is adjacent to each finger 7, excepting the penny-deflecting finger, and receives the coins or tokens deflected by such adjacent finger. The width and thickness of said chutes exceed the corresponding dimensions of the coins or tokens which they conduct only to an extent affording the latter a free edgewise descent. One of said chutes also has its mouth at the lower end of the track 6 to receive the dimes discharging from said end. A chute 8a similar to the chutes 8 engages the bar 5 in proximity to the penny-deflecting finger 7, receiving the deflected pennies. The latter are handled differently from the remaining coins and tokens, as will hereinafter appear. The chutes 8 extend downwardly at various inclinations so as to deliver coins or tokens edgewise to a detector bar 9 in a denominational relation differing from that in which they are discharged from the sorter bar. The detector bar is carried by and extends horizontally between the side walls of the casing and may be conveniently formed as a casting. (See Figs. 2, 3 and 6–10.)

The detector bar has a series of grooves extending downwardly across its front face, differently proportioned in width to form narrow passages 10 accommodating coins and tokens of different diameters. Each chute 8 discharges into one of said passages, each whereof is normally obstructed in its lower portion by a detent 11 for temporarily supporting, in vertical position, a coin or token in said passage, as indicated at 12 in Figs. 2, 6, 7, 8, 9 and 10. Said detents, as will presently appear, are movable in unison, to release any coins or tokens so supported.

The lower portions of the passages 10 require a front wall to prevent forward escape of the coins or tokens engaging said detents. Such a wall is formed by a sheet metal plate 13 suitably secured to the front face of the detector bar and horizontally elongated to cover the lower portions of all the passages 10.

Between said passages are tongues 14 (see Figs. 2 and 23) integrally upstanding from the plate 13, and beneath said tongues are clamped flexible strips 15 of rubber or the like, marginally overlapping the passages 10. The purpose of said strips is to yieldably retain against forward escape any coin or token which may occupy the upper portion of a passage 10, as exemplified at 16 in Figs. 2 and 6 resting upon an underlying coin or token of the same denomination. Between the tongues 14 are openings in the plate 13 adequate to afford a forward discharge of coins or tokens 16, when pressure is applied to the rear faces thereof, adequate to flex the strips 15. The lower portion of the plate 13 is formed with a row of openings 17, each communicating with one of the passages 10, preferably circular and of differential diameters, slightly less than the widths of the corresponding passages.

The connections established by the chutes 8 from the sorter bar to the detector bar are such that the respective passages 10, from right to left thereof, receive ticket tokens, half dollars, quarters, dimes, transfer tokens and nickels. For reasons which will presently appear, two of the openings 17, in a vertically spaced relation, open forwardly from the nickel passage 10.

Connected to the detector bar, therebeneath, in registration with the passages 10 receiving ticket tokens, half dollars and transfer tokens are sheet metal chutes 18 extending downwardly at a rearward inclination and differentially proportioned to carry the half dollars and tokens downwardly edgewise, upon discharge from said passages. (See Figs. 2, 6, 7, and 9.) Said chutes are open at their lower ends for directly delivering the half dollars and tokens into a cash drawer 19, in the bottom portion of the casing 1. It is preferred to engage the lower portions of the chutes 18 in suitable slots in a horizontal bar 21, extending between and carried by the casing side walls, whereby said chutes are definitely held in proper place.

Downwardly projecting from the detector bar and preferably integral therewith, are forwardly open, channel-shaped brackets 22, opening from the quarter, dime and nickel passages 10, each formed at its lower end with an annular head 23, engaged by a cylindrical tube 24, extending downwardly at a rearward inclination and seated at its lower end on the bar 21. (See Figs. 8, 10 and 13.) Said tubes, as will hereinafter more fully appear, form change magazines, and are preferably accommodated by differential diameters to the particular coins they are designed to receive. The bar 21 is formed with coin openings 25, registering with said tubes and corresponding to their interior diameters.

Beneath each tube 24, the bar 21 has a slideway in its under face receiving an upper coin-ejecting slide 26 and a lower coin-supporting slide 27, both preferably sheet metal plates. Each of the coin-ejecting slides has in its forward portion a single opening 28 (preferably circular) proportioned to receive a single coin from the overlying tube 24, the openings 28 in the normal positions of the ejecting slides registering with the openings 25. The slides 27, in their normal positions, close the openings 28 and support the coins individually occupying said openings as well as such superposed coins as are normally stacked in the tubes 24. Preferably, the slides 26 project rearwardly some distance beyond the bar 21, the latter being formed with rearwardly extending arms 29 which correspondingly extend the slideways (Fig. 13). The rear end of each slide 26 is connected by a coiled spring 30, to the rear wall of the casing, the slides being thus yieldably held in normally retracted positions established by stops upon their front ends. A pair of such stops 31 project oppositely laterally from the dime-ejecting slide, one forwardly overlapping a stop 32 on the quarter-ejecting slide and the other being forwardly overlapped by a stop 33 on the nickel-ejecting slide. The arrangement is thus such (see Fig. 13) that the quarter-ejecting slide in being projected must carry with it the nickel and dime slides, and the dime slide, upon actuation, must carry with it the nickel slide, the latter being further adapted for independent actuation.

Secured to the detector bar 9 rearwardly of the transfer token and nickel passages 10 of said bar are a pair of approximately similar laterally open, rearwardly projecting frames 34 and 35, formed of metal strips. The frame 34 (see Figs. 9 and 12) forms a mounting for three plungers 36, 37, and 38, laterally spaced apart by their engagement with guide slots in said frame. The forward ends of said plungers lie normally in an opening 39 of the detector bar, just clearing the transfer token passage 10 thereof, the central plunger 37 having a lug 40 integrally depending from its forward end and carrying the detent 11 which normally obstructs said passage. Said plungers all register with the opening 17 of the plate 13 which communicates with said passage, whereby any of the plungers may, as will hereinafter appear, be projected forwardly through said passage and plate.

The frame 35 (Figs. 10 and 12) mounts an upper and a lower plunger, 41 and 42 respectively, slidable forwardly and back in said frame, their forward ends lying normally within a vertical slot 43 of the detector bar and just clearing the nickel passage 10 of said bar. The plunger 42 has at its front end a depending lug 44 which carries the detent 11 normally obstructing the nickel passage. The plungers 41 and 42 register respectively with the upper and lower openings 17 which forwardly open from the nickel passage 10. Thus either of the plungers 41 and 42, under conditions which will presently appear, may be projected forwardly through the nickel passage and said plate.

Interiorly secured to the left-hand side wall of the casing for receiving pennies from the chute 8a, temporarily holding said pennies, rejecting any surplus thereof, and detecting the number remaining, is an assembly of laterally swinging rock arms, forwardly movable detector slides, and fixed guide plates, disposed one above another, as best appears in Figs. 14, 15, and 16. Enumerated from top to bottom this assembly comprises a rock arm 45, surmounted at its front end by a flare-mouthed, open-bottomed coin cup 46, normally underlying the chute 8a, a plate 47 fixed in the plane of said rock arm, a six cent detector slide 48, a rock arm 49, having a circular opening 50 at its front end proportioned to freely accommodate one cent, a plate 51 fixed in the plane of said rock arm, a four cent detector slide 52, a fixed plate 53, having an opening 54 in its forward portion, interrupting the right-hand lateral edge of said plate, a rock arm 55 having a circular opening 56 in its front end proportioned to freely receive one cent, a one cent detector slide 57 having a substantially penny-sized opening 58 in its forward portion and having a slot 59 extending from said opening to the front edge of the slide, a fixed plate 60, having a penny-receiving opening 61 in its forward portion, and a coin-supporting slide 62. Between the corresponding margins of the fixed plates are secured metal spacer strips 63, and a plurality of pins or rivets 64, 64a and 64b (Fig. 3) clamp said fixed plates and spacer strips together and rigidly surmount them on a bar 65 attached by bolts 65a or the like to the left side wall of the casing. Each of said rock arms and slides has substantially a one cent thickness, the rock arm 55, however, being increased to substantially a two cent thickness marginally of its opening 56.

The three slides 48, 52 and 57 are normally similarly retracted to establish their coin openings in vertical registration with those of the fixed plates 53 and 60, and the three rock arms 45, 49, and 55 have laterally projecting rear portions intermediately pivoted upon the pin 64a (see Fig. 3) and terminally engaged by coiled springs 66, maintaining the forward portions of said rock arms normally laterally engaged with the fixed plates 47, 51, and 53, with their coin openings registered vertically with those of the slides and fixed plates 53 and 60. The fixed plates 47 and 51 extend along the left hand margin of the assembly, and their forward portions 47a and 51a extend along the front margin of the assembly, clearing the forward ends of the rock arms.

Thus in the normal positions of the parts, the coin openings thereof jointly form a receptacle, bottomed by the slide 62, wherein pennies may accumulate one upon another to various heights, the cup 46 forming an upward extension of such receptacle.

Each of the slides 48, 52, and 57 carries at a lateral margin thereof a small roller 66a, effective on the laterally projecting rear portion of the overlying rock arm upon forward projection of such slide for rocking such arm laterally. (See Fig. 4). A lug 67 marginally depending from the uppermost rock arm 48 is engageable by the intermediate rock arm 49 when the latter is laterally swung, so that the intermediate arm carries the uppermost arm laterally, while the latter may also be independently operated.

Similarly the lowermost rock arm has a marginal upstanding lug 68 engageable with a depending marginal lug 69 on the intermediate arm, so that the latter must swing laterally with the lowermost arm, but is also operable independently of the lowermost arm.

The purpose of the three rock arms is to cause each slide, upon its forward actuation, to effect a lateral discharge or rejection from the assembly of all pennies overlying such slide. Since spaces intervene between the rock arms each accommodating one cent, each of the two lower rock arms is provided near the margin of its coin opening with a number of small upstanding projections 70 of a height to engage and carry laterally with said arms, any pennies occupying the planes of the slides which directly overlie said arms. (See Fig. 14.)

In order that each of the slides 48 and 52, when forwardly projected, may not encounter the small projections 70 of the underlying rock arms, a pair of slots 71 are extended rearwardly from the coin opening of each slide 48 and 52, so as to rearwardly register with said projections, being elongated adequately to accommodate said projections throughout the necessary travel of said slides. (Fig. 14.)

The pin or rivet 64b (Figs. 3 and 15) rigidly connects the several fixed plates of the assembly at the forward margin thereof, being located centrally in front of the coin openings of the slides. Any of the latter, when not carrying a coin, may be projected a distance to receive said pin within the coin opening of such slide. If, however, said opening is occupied by a cent, the latter must encounter the pin 64b upon a partial forward projection of the slide, reducing the possible stroke of the latter. The utility of this provision will presently appear.

When by a retraction of the bottom slide 62, pennies are discharged from the assembly just described, they are accumulated in a cylindrical change tube 71 (see Fig. 11) which like the tubes 24, forms a change magazine and extends downwardly at a rearward inclination. The upper end of the tube 71 is set into a receiver head 72 secured by screws 73 (Fig. 2) or the like to the casing 1, slightly below the front portion of the cent detector assembly. The receiver head has a flare-mouthed coin passage discharging into the tube 71, and registered with the receptacle formed by the communicating coin openings of the cent detector assembly. Said head further has an excess coin outlet 74 which opens forwardly from the delivery passage of said head.

At its lower end, the tube 71 seats upon the bar 21 in registration with a circular opening 75, perforating said bar, and beneath the latter are mounted one above another, three forwardly actuable change-making slides 76, 77, and 78, (Fig. 11) respectively formed in their forward portions with circular openings 79 normally registering with the opening 75. The slide 76, which is uppermost, has substantially a two cent thickness, the slide 77, which is positioned between the other two, has substantially a three cent thickness and the lowermost slide has substantially the thickness of one cent. The intermediate slide extends sufficiently forward beyond the companion slides, to prevent any discharge of coins from the opening 79 of the upper slide, when the latter is individually projected. Also, the intermediate slide at its rear end carries a depending lug 80, which overlaps the lowermost slide, compelling the same to advance in unison with the intermediate slide when the latter is actuated.

Said slides, in their normal positions, extend some distance rearwardly of the bar 21, and the latter is formed with rearwardly projecting arms 81 which correspondingly extend the guide-ways of said slides. (Fig. 13.)

Beneath the slides 76, 77 and 78 is mounted a coin supporting plate 82, normally forming a closure for the openings 79, said plate being rearwardly slidable to uncover said openings. (Fig. 11.)

Mechanism will now be described by which the presence of coins or tokens in the passages 10 of the detector bar 9 may be detected, and one or more of the described change making slides may be actuated to eject an amount of change determined by the denomination of said coins or tokens. Such mechanism also finally effects a retraction of the detents 11, so as to release any coins or tokens occupying said passages.

Rearwardly of the detector bar, a shaft 83 extends across the casing 1, and is journaled in bearings 84 carried by the casing side walls (Fig. 3).

Said shaft, at its right-hand end, extends exteriorly of the casing to mount a manually actuable crank 85. In interior proximity to the right hand wall of the casing, said shaft rigidly carries a ratchet wheel 86, which is engaged by a pawl 87 to permit actuation of the shaft in one direction only. (Figs. 3 and 6.)

A normal rotative position of the shaft, to which it will be returned after each actuation, is established by an elongated leaf spring 88 suitably fixed at one extremity and stressed at the other against a collar 89 fast on said shaft and having its peripheral face chordally flattened at one side thereof to seat said spring. (Figs. 3 and 6.)

Similarly rigidly mounted on said shaft is a plurality of eccentrics 90, ten thereof being provided in the illustrated construction. Said eccentrics are similarly adapted to actuate a series of vertically elongated levers 91, 92, 93, 94, 95, 96, 97, 98, 99, and 100, preferably stamped from sheet metal. In engaging said eccentrics and levers, it is preferred to form each lever with an integral arm 101 which projects above the corresponding eccentric, with ample clearance from the latter and has a terminal portion extending downwardly tangential to the eccentric, the latter being embraced between said arm and the lever proper. Also it is preferred to peripherally groove the eccentrics to receive marginal opposed portions of said levers and lever arms, thus maintaining an operative relation. Each of said levers, excepting 92 and 93, has a supporting link 102 pivoted to its lower end and upwardly extended therefrom to swing forwardly and back upon a rod 103, terminally rigidly carried by the casing side walls.

The levers 91, 92, 93, and 94 are similarly formed at their upper ends with forwardly projecting arms 104 (Figs. 6, 7, and 8) which terminally engage in slots 105 vertically formed in the detector bar 9. Said slots open rearwardly from the ticket token, half dollar, quarter, and dime passages of said bar, and normally the arms 104 just clear said passages. The detents 11 which normally obstruct said passages project integrally forward from the lower portions of the arms 104.

The levers 92 and 93 are laterally bent to allow their lower extremities to be pivotally connected at 106 respectively to the rear ends of the quarter-ejecting slide 26 and the dime-ejecting slide 26. (Fig. 3.)

The lever 94 has its lower end linked, as indicated at 107, (Fig. 8) to an arm 108 projecting rigidly downward from one end portion of a rock shaft 109 journaled transversely of the casing. The same end portion of said shaft rigidly carries a second downwardly projecting arm 108a which is linked as indicated at 107a to the rear end of the dime-ejecting slide 26. It is preferred to longitudinally slot the link 107a, as indicated at 107b, to accommodate its pivotal connection to the arm 108a. The other end portion of said shaft rigidly mounts a downwardly projecting arm 110, which is linked as indicated at 111 (see Fig. 11), to the change-making slide 77.

Each of the levers 95, 96, 97, 98, and 99 integrally carries at its upper end an arm 112 curving rearwardly and upwardly.

The arm 112 of the lever 95 is linked, as indicated at 113 (Fig. 9) to the transfer token plunger 36, and the lower end of said lever is connected by a link 114 to an arm 115 rigidly projecting downwardly from a rock shaft 116. The latter, which is journaled rearwardly of the shaft 109, rigidly carries upon its other end portion a similar arm 117 (Fig. 11) which is linked as indicated at 118, to the two cent change ejecting slide 76.

The arm 112 of the lever 96 (Fig. 10) is connected by a twisted link 119 to the midportion of a link 120 forming a swinging connection between the transfer token detecting plunger 38 and the lower nickel detecting plunger 42. (See Figs. 3 and 12.) The link 120 has a longitudinal slot 121 accommodating its connection to the plunger 38 whereby either plunger 38 and 42 may, on occasion, be actuated independently of the other. The lower end of the lever 96 is linked as indicated at 122 to an arm 123 projecting rigidly downward from an end portion of a tubular rock-shaft 124, journaled coaxially with and enclosing the shaft 116. The other end portion of the shaft 124 rigidly carries a similarly projecting arm 125 (see Fig. 11) which is linked as indicated at 126 to the one cent change ejecting slide 78.

Coiled springs 127 extending from the links 118, 111, and 126 to the rear wall of the casing 1, serve to maintain a normal retraction of the slides 76, 77, and 78.

The arm 112 of the lever 97 is linked as indicated at 128 to the upper nickel-detecting plunger 41, and the lower end of said lever is adapted by a link 129 to actuate an arm 130 rigidly depending from the mid portion of the rock shaft 109.

The arm 112 of the lever 98 is linked, as indicated at 131, to the mid portion of a link 132 which establishes a swinging connection between the rear end portion of the four cent detector slide 52 and the central transfer token detector plunger 37. Since the lower nickel detector plunger 42 lies in the preferred path of said link it is preferred to slot said plunger as indicated at 133 to accommodate said link. The latter is positioned to swing beneath the three transfer token detecting plungers, being pivoted to a lug 134 depending from the plunger 37.

The arm 112 of the lever 99 is linked, as indicated at 135, to the mid portion of a link 136 establishing a swinging connection between the rear end of the one cent detector slide 57 and the lower nickel detecting plunger 42, and slotted to afford it a limited longitudinal play relative to said plunger.

The arm 112 of the lever 100 is linked as indicated at 137 to the six cent detector slide 48. (See Fig. 11.)

The lower extremities of the three levers 98, 99, and 100 are normally rearwardly pressed against a horizontal stop rod 138 by a cross bar 139 integrally carried by the lower ends of a lever 140 and an arm 141, engaging spaced points of said cross bar. Said lever at its mid portion, and arm, at its upper end, are swung upon the rod 103, and the upper end of said lever is connected by a coiled spring 142 to the penny receiver head 72, whereby the cross bar 139 exerts rearward pressure, as aforesaid, on the lower ends of the levers 98, 99, and 100. Rearwardly extending from the upper end of the lever 140 is a swinging link 143, connecting said lever to the downwardly projecting arm 144 of a bell crank 144, 145. Further connected to said arm is a forwardly extending link bar 146 which at its front end has a pivotal actuating connection with the coin supporting slide 62 of the penny detector assembly. Through the described normal engagement of the lever 140 with the stop rod 138 and linkage connecting said lever to the slide 62, the projected coin-supporting position of said slide is normally maintained.

There will now be described mechanism for audibly indicating, both to a passenger and the attendant of the described machine, whether or not the correct fare has been deposited responsive to an operation of the shaft 83. Within the casing 1, upon the upper portion of its left hand wall, is mounted a bell comprising a gong 147 and a striker 148 carried by the free end portion of a striker arm 149, said arm being pivoted at its other end as indicated at 150. For actuating the arm 149 in its striking travel, a coiled spring 151 extends upwardly therefrom to the casing, and for normally resisting such travel, a downwardly projecting pawl 152 is pivoted upon the free end of said arm, and is shouldered to engage a pin 152a rigidly carried by the casing. A link 153 spaced below the arm 149 and substantially parallel with said arm connects the free end portion of said pawl with a downwardly projecting arm 154 of a bell crank 154, 155, from which arm a coiled spring 156 extends to the striker arm acting through the link 153 to urge the pawl 152 into engagement with its retaining pin (see Fig. 17).

As so far described, it is evident that a retraction of the pawl 152 will allow an abrupt actuation of the arm 149 by the spring 151 to the position shown in Fig. 18, whereby the gong will be sounded.

Retraction of the pawl 152 when the correct fare has been deposited is accomplished by connecting three push rods 157, 158, and 159 (Fig. 11) to the rearwardly projecting arm 155 of the bell crank 154, 155. Each of said push rods has its upper end longitudinally slotted as indicated at 160, to receive the connection to said bell crank, whereby an upward actuation of any one of said rods will rock said bell crank to the dash line, pawl-releasing position shown in Fig. 17, without interference arising from the other two push rods. The intermediate push rod 158 is pivoted at its lower end to the rearwardly projecting arm 145 of the bell crank 144, 145.

The innermost push rod 159 is connected at its lower end (see Fig. 3) to an arm 161 rigidly forwardly extending from a rock shaft 162 extending transversely of the casing adjacent to the rear wall thereof and journaled in brackets 163 on said wall. Upon its other end portion said rock shaft carries an arm 164 (see Fig. 6) which is linked as indicated at 165 to the lower extremity of the lever 91. A coiled spring 166 extends to one of the brackets 163 from the lower end of the lever 91, yieldably restraining said end from forward actuation. The lever 91 is limited in its response to said spring and held in its previously described normal position by the thrust transmitted through the link 165 to the arm 164, said thrust acting through the shaft 162, arm 161, push rod 159, bell crank 154, 155 and link 153 to the pawl 152, urging the latter against the pin 152a.

The outermost push rod 157 is connected at its lower end to a forwardly projecting arm 167 of a bell crank 167, 168, the other arm 168 of said bell crank projecting downwardly and being linked as indicated at 169 (Fig. 11) to the one cent change-ejecting slide 78.

In Fig. 18 is shown the position of the striker mechanism of the bell immediately following an effective actuation of said mechanism. For returning said mechanism to its normal position after such actuation, a lever 170 is pivoted at its mid portion upon the casing as indicated at 171, one end of said lever carrying a pin 172 projecting above the striker arm. Upon its other extremity said lever pivotally carries an upstanding pawl 173, intermediately shouldered for engagement with a pin 174, carried by the up-turned free end of an arm 175 fixed upon and projecting rearwardly from a shaft 176. Connected to the mid portion of said arm is the upper end of a vertical connecting rod 177, engaged at its lower extremity by an eccentric 178 fast upon the shaft 83 in proximity to the left hand casing wall. Normally, said eccentric projects upwardly so that upon revolving the shaft 83, the arm 175 is swung downwardly to the dash line position shown in Fig. 18, and finally returned to its normal horizontal position, appearing in full lines in Fig. 17.

When the arm 175 reaches its lower limiting position, the pin 174 clears the latch shoulder of the pawl 173, and the latter swings to engage above said pin responsive to a coiled spring 179 having its rear extremity secured to the casing, and having its forward end connected to said pawl slightly below the pivot of the latter. When, therefore, the arm 175 is returned to its normal raised position, it carries the pawl 173 upwardly, and consequently rocks the lever 170 on its pivot 171. The resulting downward actuation of the pin 172 on the rear end of said lever will lower the striker arm if its raised position has been established, and shortly before the parts complete their travel, they will assume the position shown in Fig. 19, in which the pawl 152 is adapted to engage its retaining pin 152a Just before the arm 175 reaches its normal raised position, the beveled upper end portion of the pawl 173 engages (as shown in Fig. 19) a pin 180 rigidly projecting from the casing, whereby said pawl is deflected rearwardly, disengaging it from the pin 174 and permitting said pawl and the lever 170 to again assume their normal positions shown in Fig. 17.

The shaft 176 extends transversely to and is journaled in the side walls of the casing and rigidly mounts a plurality of similar downwardly projecting arms 181, free at their lower ends and hooked forwardly at said ends to individually project into the openings 39, and slots 43, as exemplified in Figs. 6–10. In the normal positions of said arms, their hooked ends just clear the passages 10.

Upon operation of the machine the shaft 176 is rocked, as already described, through the eccentric connecting rod 177, the hooked ends of the arms being initially forwardly swung through the passages 10 and plate 13 and finally retracted to their normal positions.

In their forward swinging, said arms encounter any coins or tokens which may, as an excess deposit, occupy the upper portions of the passages 10, resting upon the proper deposit, and such excess is forwardly discharged from said passages, the flexible strips 15 yielding to the applied pressure of said arms.

Any excess coin or token ejected by the arms 181 and any change coins ejected by the slides 26, 76, 77, or 78 are caught by a pan 182 which inclines forwardly and downwardly from the bar 21 and forms at its right-hand forward portion a change pocket 183 to which the passenger has access through an opening 184 in the front wall of the casing.

Any excess of deposited pennies rejected by the rock arms 45, 49, and 55 is also delivered to the pan 182, discharging thereto through an apertured lug 185 rigidly carried by and laterally projecting from the forward end of the cent detector assembly, the openings of said arms registering with the aperture of said lug in the laterally swung position of said arms.

Any excess coins discharging from the tops of the change tubes 24 and 71 through the brackets 22 or forward outlet 74 of the receiver head 72 are conducted to the cash drawer 19 by chutes 186.

The cash drawer is preferably divided by vertical partitions 187 into a plurality of compartments wherein the half dollars, ticket tokens, quarters, transfer tokens, dimes, nickels and pennies may separately accumulate.

Preliminary to removal of the cash drawer from the casing and withdrawal from said drawer of accumulated cash and tokens, it is desirable to discharge the contents of all of the change tubes. For effecting this result in a single operation, a shaft 188 is extended transversely through the casing beneath the bar 21 and above the cash box and on said shaft is rigidly mounted a plurality of arms 189 having at their upper ends individual lost motion connection to the slides 27 and slide plate 82. Set into the right hand wall of the casing is a lock cylinder 190 which when engaged by a proper key 191 serves to rock said shaft to retract the slides 27 and 82. Thus the several change tubes will be permitted to discharge their contents to the intended compartments of the cash drawer.

In case a passenger deposits an incomplete fare in the nature of either a nickel or transfer token, it is desirable to prevent release of same from the detector bar, through subsequent operation of the machine, until the deposit has been completed.

To accomplish this result, a bar 192, forwardly extending between the frames 34 and 35, carries at its front end a cross head 193 with terminal detents 194 which normally project into the nickel and transfer token passages 10 of the detector bar, to supplement the detents 11. (See Figs. 3 and 28.) The rear end of said bar is pivoted at 194a to an arm 195 fast on one end of a rock shaft 196, which arm is acted upon by a coiled spring 197, tending to maintain the projected position of the bar 192. The other end of said rock shaft rigidly carries an arm 198 which is connected by a link bar 199 to the upper end of the lever 140, (see Fig. 11) and which is further connected by a link bar 200 to the upper end of an arm 201, fast on the shaft 124. As shown the arms 201 and 125 are integral, engaging the shaft 124 at their juncture (see Fig. 11).

Pivoted on the frame 35 and rearwardly extending therefrom is an arm 202, normally resting at its rear end on the head of the pivot pin 194a and having one or more depending guides 203 engaging the bar 192. The arm 202 extends closely above the arm 112 of the lever 96 and has, on its lower edge, a cam projection 204, just at the rear of said arm 112.

If a nickel deposit accompanied by a penny or a transfer token is deposited together with four pennies, the following actuation of the mechanism will produce a rearward rocking of the upper end of the lever 140 which will be transmitted through the link bar 199, arm 198, rock shaft 196 and arm 195 to the bar 192, retracting the latter to release the nickel or token.

If a nickel, dime, quarter or half dollar is deposited together with a transfer token, the subsequent actuation of the mechanism will involve a rearward rocking of the arm 201 which will be transmitted through the link bar 200, and effect retraction of the detent bar 192, as already described.

If a nickel or transfer token deposit lacks a suitable accompanying coin, the detent bar 201 will not be retracted and the deposit will not be released on subsequent operation of the machine.

The rear end of the arm 202 drops, as appears in Fig. 27, upon a retraction of the detent bar 19e and engages the head of the pin 194a to maintain retraction of the detent bar until the cycle of operations is almost completed. In completion of said cycle, the upper end of the lever 96 rides against the cam projections 204 to elevate the arm 202 sufficiently to permit projections of the detent bar by the spring 197. The arm 202 is required, because the lever 140 and arm 201 return to their normal positions before the detent 11 is in release position, and it is necessary to prolong retraction of the detent bar 192 to afford adequate time for discharge of a nickel or transfer token, forming part of a complete deposit.

In operation of the described machine, the passenger, if paying a six cent fare, deposits in the hopper 3 any of the following: a ticket token, a half dollar, a quarter, a dime, two nickels, a nickel and one cent, or six pennies. If paying a four cent fare, a transfer token must be deposited, together with any of the following: a half dollar, a quarter, a dime, a nickel, or four pennies.

The deposited coin, coins, or token will discharge singly upon the upper end portion of the track 6 and rolling down the track incline will (with the exception of dimes) encounter the sorting fingers 7. The latter will throw the coins or tokens forwardly from the track, separating them according to their denomination and introducing each denomination into its intended chute 8 or 8a. The dimes will discharge directly into the intended chute 8 from the lower end of the track 6.

The passages 10 of the detector bar 9 will receive the coins or tokens from the chutes 8, said chutes being curved, as best appears in Fig. 2, so that the relative denominational order of said passages is independent of the relative diameters of the coins and tokens. Thus in the illustrated construction, the passages 9 from right to left of the feeler bar are designed to receive ticket tokens half dollars, quarters, dimes, transfer tokens, and nickels. This relation of said passages promotes a desired coacting relation between the quarter, dime, and nickel change slides, and further promotes certain connections between the transfer token detecting plungers, nickel detecting plungers and penny detector slides to be conveniently established, as will presently fully appear. In the lower portions of the passages 10, the ticket token, half dollar, quarter, dime, transfer token or two nickels are adapted to be supported by the detents 11 during a detecting operation. When two nickels are deposited, they will rest one upon the other in the nickel passage, the lowermost engaging said detent.

If through error a second ticket token, half dollar, quarter, dime, or transfer token is deposited, the same will assume a position in the top portion of one of the passages 9, (see Fig. 6) resting upon the first deposited coin or token, and if a third nickel is erroneously deposited it will similarly be supported by the two first deposited nickels in the upper portion of the nickel passage.

If the deposit consists of or includes a penny, or pennies, the same are delivered to the chute 8a and thence to the coin cup 46, accumulating in the penny detector assembly.

Following upon any deposit in the machine, the attendant turns the crank 85 counter clockwise through one complete revolution, thus actuating to that extent all of the eccentrics 90 and also the eccentric 178. Since the eccentrics 90 all normally project upwardly, their described actuation tends to swing the levers 91, 92, 93, 94, 95, 96, 97, 98, 99 and 100 first forwardly, then rearwardly, and finally a lesser distance forwardly to their normal positions. When thus actuated, the levers tend to fulcrum at their lower ends, since the latter are under restraint, as will presently more fully appear, while their upper ends are free. If the upper end of any of said levers is restrained from forward actuation by the presence of a coin or token in the corresponding passage 10, the lower end of such lever will yield, while its upper end fulcrums on such coin or token.

When the lever 91 encounters a ticket token in the detector bar, the resulting forward travel of said lever at its lower end acts through the link 165 and arm 164 (Fig. 6) to rock the shaft 162, whereby the arm 161 on the latter thrusts up the bar 159 and releases the striker arm 149 (Figs. 3 and 17), whereby the gong 147 is struck, as hereinbefore explained. During the second quarter of its revolution, the eccentric actuating the lever 91 returns the latter to its normal position. During the third quarter of its revolution, said eccentric actuates said lever rearwardly from its normal position, the lower end of the lever yielding during the major portion of said quarter and its upper portion yielding during the final portion of said quarter, after lost motion in the push rod 159 is taken up. Thus during the final portion of the third quarter of its revolution said eccentric retracts the detent 11 from the ticket token passage and allows the token to discharge to the cash box by way of the chute 18 leading from said passage.

When actuation of the shaft 83 presses the upper end of the lever 92 against a half dollar supported by the detent 11 of said lever, the lower end of said lever yields forwardly, overcoming the spring 30 and projects the quarter-ejecting slide 26. The latter, because of the stops 31, 32 and 33, carries with it the dime and nickel slides, so that said slides discharge forty cents in change. Since the dime slide is linked at 107a to the arm 108a of the shaft 109, the latter acts through its arm 110 and the link 111 to further project the slide 77. This by virtue of its lug 80 also projects the slide 78, so that a total of forty-four cents in change is ejected upon detection of a half dollar deposit.

The eccentric actuating the lever 92, in completing the third quarter of its revolution, retracts the detent 11 clear of the half dollar passage 10 and allows the half dollar to discharge through the proper chute 18 to the cash box.

The lever 93, upon encountering a quarter, similarly acts to project the dime and nickel ejecting slides as well as the three and one cent change slides 77 and 78, delivering a total of nineteen cents in change.

When the deposit is a dime, the same is detected by the lever 94, and resulting forward actuation of the lower end of said lever acts through the link 107, arm 108, shaft 109, arm 110, link 111, and slides 77 and 78 to eject four cents in change.

When the deposit is a transfer token together with a a half dollar, quarter, or dime, there will be ejected forty-four, nineteen or four cents as already described, and an additional two cents in change will be ejected, through actuation of the two cent change slide 76 in substantial unison with the slides 77 and 78. The plunger 36 upon encountering the transfer token, restrains the upper end of the lever 95, (Fig. 9) thus entailing a forward actuation of the lower end of said lever, which through the link, 114, arm 115, rock shaft 116, arm 117, and link 118, projects the two cent slide.

If a transfer token be deposited with no accompanying coin, the two cent change slide will be projected, as above described, on the ensuing operation of the machine, but the two cents projected with said slide will be carried back into registration with the penny change tube 71, since the projecting forward portion of the underlying slide 77 prevents discharge of the two cents.

When the deposit consists of a transfer token and nickel, the plungers 38 and 42 (Fig. 12) will be both restrained from forward actuation. This restraint will be transmitted to the upper end of the lever 96 since the links 119 and 120 connect said end to both of said plungers. Therefore, operation of the machine, following upon said deposit, effects a forward actuation of the lower end of the lever 96, and this through the link 122, arm 123, tubular rock-shaft 124, (Fig. 10), arm 125, and link 126, (Fig. 11) effects a projection of the slide 78, whereby one cent change is delivered to the passenger.

When the deposit consists of two nickels, the uppermost thereof is engaged by the detector plunger 41, upon ensuing operation of the machine. Since said plunger is linked at 128 to the upper end of the lever 97, said end is restrained from forward actuation. The lower end of said lever is therefore rocked forwardly, and acts through the link 129, arm 130, rock shaft 109, arm 110, link 111, and slides 77 and 78 to deliver four cents change to the paassenger.

When the deposit consists of a transfer token and four cents, the plungers 36, 37, and 38 will be restrained from forward actuation, and the four cent detector slide 52 will be afforded only a partial projection since the uppermost cent of the deposit will be carried forward by said slide and will encounter the stop pin 64b. The restraint thus imposed will be transmitted to the upper end of the lever 98, since it is connected by the links 131 and 132 to both said plunger and said slide. Consequently operation of the machine following upon said deposit will effect a forward actuation of the lower end of the lever 98, acting upon the cross bar 139 to rock the lever 140 in opposition to its restraining spring 142. Resulting rearward travel of the upper end of said lever is effective through the link 143, bell crank arm 144 and link 146 to retract the bottom slide 62 of the center detector assembly, whereby four cents will discharge from said assembly into the penny change tube 71. The penny displaced by the slide 52 and at this time engaging the stop pin 64b will not discharge since it is retained between the arms 47a and 51a of the fixed plates 47 and 51, and upon retraction of the slide 52, said penny will drop down upon the bottom slide 62, to remain until the next actuation of said slide.

If the deposit improperly consists solely of a token, or of four cents without an accompanying token, the link 132 will rock about one or the other of its ends when actuated by the lever 98 and will not so restrain the upper end of said lever as to induce a forward actuation of the lower end of said lever. Hence the token will be retained in its detector bar position or the four cents retained in the penny detector assembly until the passenger completes his deposit, and the attendant again operates the machine.

When the deposit consists of a nickel and one penny, the plunger 42 will be restrained upon the ensuing operation of the machine, from forward actuation, and the one cent change slide 78 will be afforded only a partial projection, due to engagement of the deposited penny with the stop pin 64b, when carried forward by said slide. The restraint thus imposed on said plunger and slide will be communicated to the upper end of the lever 99 through the links 135 and 136, and the lower end of the lever 99 will hence be forwardly actuated. As explained in connection with the lever 98, this will rock the lever 140, and act through the parts 143, 144, and 146 to retract the slide 62. Such retraction will discharge one cent to the penny change tube from the one cent detector assembly, the last deposited cent being retained, in its projected, stop pin engaging position, through engagement between the fixed plates 53 and 60.

Such a discharge will not be accomplished if a nickel has been deposited without a penny or a penny without a nickel, since in such case the link 136 will be rocked about one or the other of its extremities without limiting forward advance of the upper end of the lever 99.

When the deposit consists of six pennies, the same will form a stack resting in the cent detector assembly on the penny which is always retained therein. On the ensuing operation of the machine, the six cent detector slide will encounter the uppermost of the six pennies projecting it into engagement with the stop pin 64b. This will limit forward actuation of the upper end of the lever 100, and thereby effect such an actuation of the lower end of said lever. As in the case of the levers 98 and 99, this will shift the cross bar 139 forwardly, rocking the upper end of the lever 140 rearwardly and acting through the parts 143, 144 and 146 to retract the slide 62. This will allow a six cent discharge to the penny change tube from the cent detector assembly, the uppermost cent being held projected during such discharge against the stop pin 64b and being held from discharge by its engagement between the arms 47a of the fixed plates 47 and 51.

The one cent slide, when projected, is compelled by the link 169 and bell crank 167, 168 to shift the push rod 157 upwardly, to thereby rock the striker arm releasing bell crank 154, 155. The lug 80 compels the one cent slide to advance in unison with the three cent ejecting slide. Thus the push rod 157 is effective to ring the bell whenever there is a delivery of either four cents or one cent charge.

Whenever an exact fare is paid, as a nickel and one cent, or four pennies or six pennies, a rocking of the lever 140 is entailed, as has been explained, by the ensuing machine operation and the bell will be rung through uptravel of the push rod 158 accomplished from said lever through the link 143 and bell crank 144, 145.

While the invention, as described, is adapted to collect certain specified fares, it is to be understood that the mechanism is to a large extent applicable to collect fares or fees other than those specified, and that the change-making function of the machine can serve for various other purposes than fare collections.

While it is apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. In a change making and fare collecting machine, a casing having a coin inlet, a coin passage extending from said inlet downwardly within said casing, an element normally obstructing said passage to interrupt the descent of a coin, and movable to release said coin, a change coin receptacle in said casing, an ejector movable to discharge a change coin from said receptacle, a lever having alternative motions and having a portion advanceable by one of said motions into said coin passage and across its area occupied by a coin when the latter is lodged against said obstructing element, said lever in the other of said motions fulcruming against said obstructed coin and acting upon said ejector to discharge a change coin from said receptacle, and actuating means for said lever effective upon said obstructing element to release the obstructed coin, subsequent to the discharge of the change coin from said ejector.

2. A change making machine as set forth in claim 1, said obstructing element being carried by said lever.

3. A change making machine as set forth in claim 1, said lever being engageable substantially at one end with the obstructing coin and being effective substantially at its other end upon said ejector.

4. In a change making machine, a casing having a coin inlet, a coin passage extending from said inlet downwardly within said casing, an element normally obstructing said passage to interrupt the descent of a coin and movable to release such coin, a bell within said casing comprising a gong and coacting striker arm, a spring urging said arm toward the gong, a latch normally holding said arm retracted from the gong, a lever mechanism actuable by said lever for releasing said latch, said lever having alternative motions and having a portion advanceable by one of said motions into said coin passage and across its area occupied by a coin lodged against said obstructing element, said lever in the other of said motions fulcruming against said lodged coin and acting through said mechanism to release said latch, and a common means for actuating said lever withdrawing said obstructing element from said passage and retracting said striker arm from said gong.

5. In a change making machine, a plurality of coin receptacles, a plurality of passages for coins of different denominations, each adapted to receive coins of one denomination, and each discharging into one of said receptacles, an ejector associated with each of said receptacles, for ejecting a coin therefrom, a plurality of elements each normally obstructing one of said passages for halting a coin in its downward travel to the corresponding receptacle, said elements being each movable to release the engaged coin, a plurality of levers each having one portion normally freely movable through one of said passages, upon actuation of said lever, said portion being engageable with a coin in said passage when halted by said obstructing element, each such lever having another portion effective to actuate one of said coin ejectors when the first mentioned portion encounters a coin, means for actuating said levers in common, and means normally holding said levers clear of said passages, said levers being effective upon said obstructing elements to withdraw them from said passages, subsequent to actuation of said ejectors, each lever being effective upon an ejector for coins of a lesser denomination than that of the coin encountered by said lever to render it effective on such ejector.

6. A change making machine as set forth by claim 1, the actuating means for said levers comprising a shaft and a plurality of eccentrics on said shaft each engaging one of said levers.

7. In a change making machine, a casing having an inlet for receiving coins of different denominations, in payment of a definite sum, with or without a token, means within said casing for holding a supply of change coins of several denominations, mechanism in said casing under automatic control of a deposited coin, including an actuating element extending exteriorly of the casing for delivering from said holding means the change required by said deposited coin in payment of said definite sum, and means responsive to deposit of a token in addition to the deposited coin for increasing by a definite, predetermined amount the change delivered from any deposited coin.

8. In a change making machine, a plurality of change coin receptacles, a plurality of passages for coins of different denominations leading individually to said receptacles and each adapted to deliver coins of a certain denomination to a certain one of said receptacles, a token delivery passage, an ejector associated with each of said receptacles for ejecting a coin therefrom, a plurality of elements, each normally obstructing one of said passages for interrupting downward travel of a coin or token in said passage, said elements being each movable to release such coin or token, a plurality of levers, each having one portion normally freely movable through one of said coin passages upon actuation of said lever, said portion being positioned with reference to said obstructing element to encounter any coins lodged against said element, each lever having another portion effective to actuate one of said coin ejectors when the first mentioned portion encounters a coin, a member connected to another of said levers movable by said lever through the token passage and acting to modify the actuation of said lever upon encountering a token in said passage, means for actuating said levers in common, means normally holding said levers and token engaging member clear of said passages, and mechanism responding to a modified actuation of the token engaging lever for varying the amount of change ejected.

9. In a change making machine, a receptacle for change coins of a certain denomination, an ejector associated with said receptacle for discharging a coin therefrom, a downwardly extending passage for coins of one denomination, a downwardly extending token passage, an element normally obstructing each of said passages, movable to clear said passage, a change delivery mechanism comprising members movable through each of said passages, in line with a coin or token engaging said obstructing element, and effective through resistance offered by a coin and token to both of said members to actuate said ejector, said mechanism comprising a lost motion connection between said elements, rendering resistance of one thereof inadequate to effect actuation of said ejector, and means for actuating said mechanism, said mechanism being effective upon said obstructing elements, to clear said passages, subsequent to actuation of said ejector.

10. A change making machine as set forth by claim 9, said coin and token-engaging members being plungers.

11. In a change making machine, a coin supporting member, a detector slide overlying said coin supporting member and formed with a coin-receiving opening, a rock arm normally extending above said slide and having a coin opening normally vertically registered with the coin opening of said slide, means carried by said slide, in its sliding travel, for rocking said rock arm laterally of said slide, and mechanism for actuating said slide.

12. In a change making machine, as set forth in claim 11, said coin-supporting member being a slide, mechanism for actuating the last named slide.

13. In a change making machine, an open topped change receptacle, an ejector for discharging a coin from said receptacle, a plurality of slides mounted above said receptacle having coin openings, registering in the normal position of said slides with each other and with the top opening of said receptacle, means for delivering coins to the openings of said slides in their registered positions, a coin support underlying said slides and normally forming a bottom closure for said openings and movable to uncover said openings, said slides being spaced above said support distances equal to various predetermined joint thicknesses of said coins, means engageable with a coin in any of said slides for limiting travel of such slide, and mechanism for actuating said coin support to uncover said openings, and connections to said mechanism from each of said slides, requiring a limitation of travel of one of said slides to functioning of said mechanism.

14. In a change making machine, means for receiving coins of different denominations, and establishing differential detecting positions of the coins of different denominations, said means further establishing differential positions for coins of said denominations in excess of one, change delivery mechanism comprising members, one of which is movable, upon actuation of said mechanism, through each of said detecting positions, when such position is vacant, each of said members, upon encountering a coin in detecting position, regulating the action of said mechanism to effect delivery of the change required by such coin, mechanism for ejecting an excess coin from any of said excess coin positions, and a common means for actuating said mechanisms.

15. In a fare collecting and change making machine, a casing having a coin inlet, a coin passage extending from said inlet downwardly within said casing, a transverse slot through the walls of said passage, a finger moveable transversely of said passage through said slot to engage with a coin therein, an obstruction projecting from said finger and acting normally as a support for a coin deposited in said passage, finger moving means comprising a main operating shaft, the initial rotation of which is adapted in the absence of a coin to move said finger freely through said slot, manually operated means for rotating said shaft in one direction, and ratchet means for preventing the reverse motion of said shaft, a change coin receptacle in said casing, an ejector moveable to discharge a coin from said receptacle, a lever connected to said ejector and mounted on said shaft, said lever being adapted to be put into operation with said ejector by the shaft by engagement of the finger with the coin during the initial rotation of said shaft, means operative during a period of rotation of the shaft subsequent to the operation of said coin ejector to temporarily withdraw the finger and its obstruction from said passage to permit the coin to drop down the passage and to release the operative connection between said shaft and said ejector, automatic means to return the ejector to its initial position, means operative during the final period of rotation of said shaft to return the obstruction to its original position in the passage and automatic means for holding the finger in its initial position.

16. In a fare collecting and change making machine, the combination with a casing, a change coin receptacle in said casing, a rotating operating shaft, and a change slide located beneath said receptacle of a slide actuating lever connected to said slide at one end and normally freely engaging with the shaft at a point intermediate its ends, a downwardly extending coin passage having a slot therein, a finger adapted to be moved through said slot by the initial rotation of said shaft, an obstruction on said finger to support a coin in said passage to obstruct the movement of the finger through said slot, means operable by the lateral pressure of the finger against said coin for rendering said lever moveable by said shaft so that said lever moves said change slide to discharge a coin from said receptacle means operable by the continued movement of said shaft to withdraw said finger from said slot to release the coin from said obstruction, automatic means to return the change slide to its initial position, manually operated means to return the finger to and automatic means to hold it in its initial position, ratchet means to prevent the reverse rotation of the shaft.

17. A coin operated mechanism, comprising a lever, a rotary actuating member engaging the lever between the ends of the lever, an actuable member pivoted to one end of the lever, means yieldably resisting actuation of the actuable member, whereby the lever, upon actuation, tends to swing about its pivoted end, a passage having a coin inlet and having a portion in the path of the other end of the lever, as it swings about said pivoted end, and an element adapted to obstruct a coin in said passage at a point in the path of the lever, whereby the lever may fulcrum on a coin, so obstructed, in actuating the actuable member.

HOMER B. STUART.